June 10, 1952     A. A. WARNER     2,599,793
SPRAG TYPE CLUTCH
Filed Sept. 25, 1946
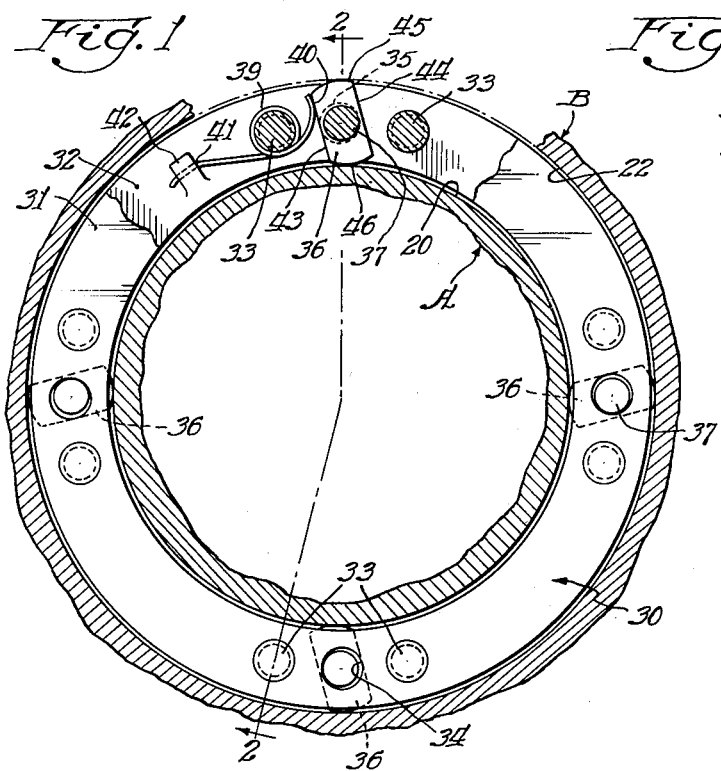
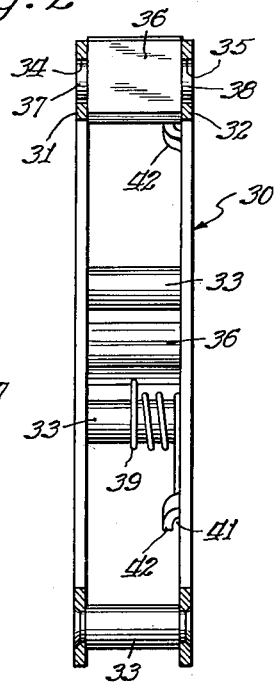
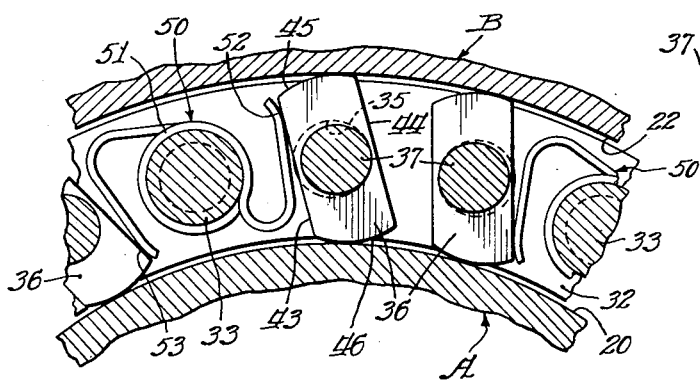
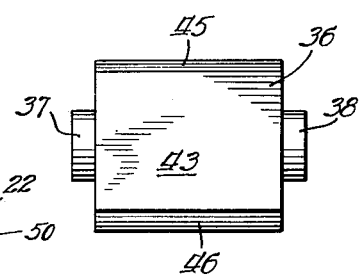
Inventor:
Archibald A. Warner Patented June 10, 1952

2,599,793

UNITED STATES PATENT OFFICE 2,599,793

SPRAG TYPE CLUTCH

Archibald A. Warner, Rockford, Ill., assignor to Borg-Warner Corporation, Chicago, Ill., a corporation of Illinois Application September 25, 1946, Serial No. 699,106

2 Claims. (Cl. 192—45.1)

The invention relates to clutches and is particularly concerned with clutches of the one-way type.

The invention seeks, as a principal object and accomplishment, to provide a one-way clutch such as contemplated herein and characterized by a novel combination of parts arranged and adapted to provide a compact assembly which will successfully combine the factors of structural simplicity, efficiency and durability thereby to increase its versatility in use, and yet be economical to manufacture.

Another object of the invention is to provide a simply constructed one-way clutch that is capable of being made of small dimensions and which is especially adapted for use where comparatively low torque is required.

A further object of the invention is to provide an effective one-way clutch that is made of few parts that may be quickly assembled and which will operate instantaneously upon reversal of the rotation of the drive member.

Another object and accomplishment of the invention is to improve the construction of one-way clutches as contemplated herein with respect to efficiency of operation and economy in their manufacture, and to this end a feature of the invention is to provide a one-way clutch comprising two oppositely arranged side plates held in predetermined spaced relationship by a plurality of annularly spaced cross bars, said side plates having a plurality of apertures arranged opposite each other in the respective side plates, a plurality of sprags having trunnions adapted to be received into said apertures and being free to rotate about their own axes in said apertures, and individual spring means arranged and assembled on said cross bars adjacent each sprag, one end of said spring being in engagement with the sprag and the other end being hooked over a projection suitably stamped in the side plate thereby to cause slight spring tension against the sprag when assembled in its operative position.

A still further object of the invention is to provide a one-way clutch of the above character whereby a uniform pressure against the sprags midway between the trunnions is effected to effectively provide uniform loading.

The invention has for a further object to provide a one-way clutch of the above character wherein the sprags are provided with individual springs arranged and mounted in a novel manner thereby to eliminate the possibility of a spring becoming detached and be free to interfere with the function and operation of other springs in the event of a spring failure or where the spring is secured by hooking the spring over a pin or through a hole at each end as is found in the prior art structures.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing which forms a part of this specification, wherein:

Fig. 1 is a side elevational view of a one-way clutch embodying the present invention, and wherein certain parts of the clutch have been cut away to more clearly show the construction thereof;

Fig. 2 is a sectional view of the one-way clutch depicted in Fig. 1 and taken substantially on the plane of the line 2—2 in Fig. 1;

Fig. 3 is an elevation view of a sprag employed in the present invention; and

Fig. 4 is a fragmentary sectional view of a modified form of a one-way clutch contemplated by the present invention.

The drawing is to be understood as being more or less of a schematic character for the purpose of illustrating and disclosing typical or preferred forms of the improvements contemplated herein, and in the drawing like reference characters identify the same parts in the several views.

Referring to the drawings, specifically Fig. 1, I have illustrated the present one-way clutch assembled in operative position between a driven member which I have designated in its entirely by the letter A and a driving member which I have designated in its entirety by the letter B. In some applications, it may be preferable to have the driving and driven elements in reversed positions.

The driven member A is provided with a smooth cylindrical peripheral surface 20 adapted to be employed as an inner race for the one-way clutch to be hereinafter described in detail.

The driving member B is provided with a smooth inner cylindrical surface 22 concentrically arranged in spaced relationship with the race 20 and adapted to form an outer race for the one-way clutch.

It will be observed that the arrangement of the one-way clutch to be hereinafter described in detail is such as to effectively couple the driving and driven members in one direction of operation and to release these members when the direction of operation is reversed so that either the driving member or the driven member may be rotated independently of the other member.

Suffice it to say, since the invention is not particularly concerned with the precise construction of the driving and driven members generally, they will not be further described in detail. It is to be understood that details of construction of these members may be modified to suit particular conditions, and may in some cases include suitable anti-friction devices, but I do not wish to be limited to the details of construction of these elements as set forth.

Having thus described the general environment surrounding the one-way clutch with which the present invention is particularly concerned, the specific construction and the cooperating functions of the parts of said one-way clutch will now be described in detail.

In the exemplary embodiment of the invention depicted in Figs. 1 and 2, the one-way clutch assembly is designated in its entirety by the numeral 30 and comprises generally, two oppositely arranged annular side plates 31 and 32 held in predetermined spaced relationship in parallel planes by a plurality of annularly spaced cross bars as at 33, said side plates having substantially larger radial dimensions than axial dimensions and having a plurality of apertures 34 and 35, respectively arranged opposite each other, a plurality of sprags 36 having trunnions 37 and 38 integrally formed with each end of the sprags and adapted to be received into said apertures and being free to rotate about upon their own axes in said apertures, and individual spring means as at 39 arranged and assembled on said cross bars adjacent each sprag, portions adjacent one end of said spring means as at 40 being in engagement with the sprag 36, and portions adjacent the opposite end of said spring as at 41 being hooked over and held in restricted position by a tongue projection 42 integrally formed with and stamped from the related side plate 32, thereby to cause slight spring tension against the sprag when assembled in its operative position.

In accordance with this invention, the sprags 36 are prismatic in section, having straight parallel sides 43 and 44 and ends as at 45 and 46 formed on circular arcs struck about centers spaced widthwise of the sprags, so that the diagonal length in one direction is greater than that in the other direction, thereby to cause the wedging angle to increase as the grip on the sprags tightens, which increases the torque capacity of the clutch. It will be observed that the apertures 34 and 35 in the side plates 31 and 32 are of greater diameter than the trunnions 37 and 38 which are received by the apertures to facilitate rotative movement of the sprags.

The sprags 36 normally lie at angles to radii struck through the center of the driven member A, as shown in Fig. 1, and when tilted in this position, will permit counterclockwise rotation of the driving member B relative to the driven member A. If the driving member B should attempt to turn clockwise relative to the driven member A, or if the driven member A should overrun the driving member B, the sprags 36 will be locked to a more nearly radial position and will bind against the races 20 and 22 to hold the driven and driving members against rotation with respect to each other.

The position of the sprags 36, as shown, clear the race surfaces so that the races may rotate freely relative to each other. It will be noted that the opposite ends 45 and 46 of the sprags 36 engage the races 20 and 22 in such a way that when the driving member B is rotated clockwise relative to the driven member A, the sprags tend to rotate into a position in which they engage the races to prevent relative rotation between the driven and driving members. It is to be understood that the race of the driving member B will be free to rotate in a counterclockwise direction as noted above, but if the driven member A tends to overrun the driving member B in a counterclockwise direction, the engagement of the ends 45 and 46 of the sprags 36 with the races will tilt the sprags and force them into tight engagement with the races thereby locking the races against relative rotation.

It will be observed that the apertures 34 and 35 in the side plates 31 and 32 are of greater diameter than the trunnions 37 and 38 which are received by the apertures. This important feature permits slight movement of the sprags at angles to a line parallel to the axis of the driven and driving members, to provide advantages of proper seating and wedging contact of the ends 45 ad 46 of the sprags with the races 22 and 20 respectively. In addition, the larger diameter of the apertures permits slight movement of the axes of the sprags and thereby bodily movement of the sprags, relative to the side plates, about the axis of the driving and driven members B and A, which prevents any stresses or shearing forces being placed on the trunnions of the sprags by the forces induced when the sprags are engaged.

Furthermore, it has been found particularly desirable to provide a uniform resilient pressure against the sprags, which will cause the proper seating thereof and hold them in their operative positions. It is particularly desirable to provide a slight pressure at the center of the sprag, as shown in Fig. 2, which will permit the ends of the sprags adjacent the trunnions to move slightly at angles with respect to a line parallel to the axis of the driving and driven members to facilitate proper seating of the ends 45 and 46 of the sprags against their respective related races. This feature is advantageously accomplished in the present invention by the employment of spring means as at 39 comprising a wire spring, of suitable thickness and tension, defining convolutions adapted to receive and to be supported by said cross bars 33, and having portions adjacent one end as at 40 in central engagement with the sprag 36, as shown in Fig. 2, and portions adjacent the opposite end as at 41 and hooked over and held in restricted position by the tongue projection 42 integrally formed with and stamped from the related side plate 32, thereby to cause slight spring tension against the sprag when assembled in its operative position. With this construction and arrangement of parts, quick positive action in the proper seating and wedging of the sprags between the driven and driving members is accomplished.

The present clutch may be made in comparatively small dimensions. Heretofore, with the arrangements found in the prior art, it was not practical to construct a clutch of small dimensions as found in the present invention, and yet have the advantages found in the present invention.

The construction of Fig. 4 is substantially similar in most respects to that of Figs. 1, 2 and 3, and parts therein corresponding to like parts in Figs. 1, 2 and 3 have been indcated by the same numerals. In some cases, where greater torque is required it may be advantageous to include more sprags than are found in the construction disclosed in Fig. 1. Referring to Fig. 4, I have positioned the sprags 36 spaced equidistantly from a cross bar 33, one at each side thereof.

In order to provide a slight resilient uniform pressure against the sprags to hold them in their operative positions, I employ spring means, designated in its entirety by the numeral 50 and comprising a wire spring of suitable thickness and tension defining convolutions 51 adapted to receive and to be supported by the cross bar 33 and having portions adjacent one end as at 52 in engagement with one sprag 36 and having portions adjacent the opposite end as at 53 in engagement with another sprag 36, thereby to cause a slight spring tension against each of said sprags when assembled in their operative position.

From the foregoing disclosure, it can be seen that I have provided a one-way clutch which efficiently fulfills the objects hereinbefore set forth and provides numerous advantages which may be summarized as follows:

(1) Structurally simple, efficient and durable;
(2) Economical to manufacture and readily adaptable to mass production manufacture;
(3) Capable of being made in small dimensions; and
(4) Quick acting.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. A one-way clutch assembly adaptable to be positioned between spaced coaxially arranged driven and driving members adapted for movement independent of each other and simultaneously with each other, comprising annular side plates oppositely arranged and held in predetermined spaced relationship in parallel planes by a plurality of annularly spaced cross bars, said side plates having a plurality of apertures arranged opposite each other in the respective side plates, a plurality of sprags each having a trunnion at each end thereof and said trunnions being adaptable to be received into said apertures and being free to rotate about upon their own axes in said apertures, one of said side plates having tongue projections, and individual spring means for each sprag comprising a wire spring defining convolutions adapted to receive and be carried by a cross bar and having portions adjacent one end in central engagement with a sprag and portions adjacent the opposite end being hooked over and held in restricted position by one of said tongue projections, thereby to cause a relatively slight spring tension against the sprag when assembled in its operative position.

2. A one-way clutch assembly adaptable to be positioned between spaced coaxially arranged driven and driving members adapted for movement independent of each other and simultaneously with each other, comprising annular side plates oppositely arranged and held in predetermined spaced relationship in parallel planes by a plurality of annularly spaced cross bars, said side plates having a plurality of apertures arranged opposite each other in the respective side plates, a plurality of sprags each having a trunnion at each end thereof and said trunnions being adaptable to be received into said apertures and being free to rotate about upon their own axes in said apertures, each aperture being of substantially greater diameter than the trunnion received therein to permit movement of the sprags at angles to a line parallel to the axis of the driving and driven members and movement of the axes of the sprags and thereby bodily movement of the sprags, relative to the side plates, in opposite directions circumferentially about the axis of the driving and driven members to prevent stresses or shearing forces being placed on the trunnions of the sprags when the sprags are engaged by the driving and driven members, one of said side plates having tongue projections, and individual spring means for each sprag comprising a wire spring defining convolutions adapted to receive and be carried by a cross bar and having portions adjacent one end in engagement with a sprag and portions adjacent the opposite end hooked over and held in restricted position by one of said tongue projections, thereby to cause a relatively slight spring tension against the sprag when assembled in its operative position.

ARCHIBALD A. WARNER.

REFERENCES CITED

The following references are of record in the file of this patent:

UNITED STATES PATENTS

| Number | Name | Date |
|---|---|---|
| 1,857,020 | Hatcher | May 3, 1932 |
| 2,023,961 | Leichsenring, Jr. | Dec. 10, 1935 |
| 2,039,149 | Dodge | Apr. 28, 1936 |
| 2,181,700 | Leichsenring, Jr. | Nov. 28, 1939 |
| 2,360,481 | Dodge | Oct. 17, 1944 |
| 2,383,595 | Dodge | Aug. 28, 1945 |
| 2,385,795 | Dodge | Oct. 2, 1945 |
| 2,404,221 | Dodge | July 16, 1946 |
| 2,407,772 | Dodge | Sept. 17, 1946 |
| 2,408,962 | Swendson et al. | Oct. 8, 1946 |